US009131363B2

(12) United States Patent
Vujcic

(10) Patent No.: US 9,131,363 B2
(45) Date of Patent: Sep. 8, 2015

(54) CARRIER AGGREGATION MANAGEMENT AND RELATED DEVICE AND SYSTEM

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 13/885,447

(22) PCT Filed: Jul. 20, 2011

(86) PCT No.: PCT/KR2011/005315
§ 371 (c)(1),
(2), (4) Date: May 15, 2013

(87) PCT Pub. No.: WO2012/067333
PCT Pub. Date: May 24, 2012

(65) Prior Publication Data
US 2013/0237208 A1    Sep. 12, 2013

Related U.S. Application Data

(60) Provisional application No. 61/414,354, filed on Nov. 16, 2010.

(51) Int. Cl.
*H04W 28/16*   (2009.01)
*H04W 8/22*    (2009.01)
*H04B 7/155*   (2006.01)
*H04L 5/00*    (2006.01)
*H04W 24/02*   (2009.01)

(52) U.S. Cl.
CPC ............. *H04W 8/22* (2013.01); *H04B 7/15507* (2013.01); *H04L 5/001* (2013.01); *H04L 5/0032* (2013.01); *H04L 5/0064* (2013.01); *H04L 5/0087* (2013.01); *H04L 5/0098* (2013.01); *H04W 24/02* (2013.01); *H04L 5/0023* (2013.01)

(58) Field of Classification Search
CPC .......... H04W 74/0833; H04W 76/048; H04W 36/30; H04W 24/10; H04L 5/001; H04L 5/0032
See application file for complete search history.

(56) References Cited

U.S. PATENT DOCUMENTS

2011/0249578 A1* 10/2011 Nayeb Nazar et al. ....... 370/252
2012/0076021 A1*  3/2012 Sambhwani ................... 370/252

OTHER PUBLICATIONS

3GPP, '3rd Generation Partnership Project; Technical Specification Group Radio Access Network; Evolved Universal Terrestrial Radio Access (E-UTRA); Further advancements for E-UTRA physical layer aspects (Release 9).' 3GPP TR 36.814 V9.0.0, Mar. 2010.
(Continued)

*Primary Examiner* — Quan M Hua
(74) *Attorney, Agent, or Firm* — Morgan, Lewis & Bockius LLP

(57) ABSTRACT

Method for managing activation or deactivation of a secondary serving cell, SCell, for a base station (310) of a radiocommunication network and a User Equipment (320), UE, initially using a primary serving cell, PCell, and supporting Carrier Aggregation so as to aggregate SCell to PCell, the method comprising: —the UE obtaining information suggesting that an activation/deactivation command to activate/deactivate an SCell is likely to be received by the UE from the base station, said information obtaining taking place before said activation/deactivation command is actually received; —activating/deactivating an SCell as early as possible after said activation/deactivation command is received by the UE from the base station.

10 Claims, 6 Drawing Sheets

(56) References Cited

OTHER PUBLICATIONS

3GPP, '3rd Generation Partnership Project; Technical Specification Group Radio Access Network; Evolved Universal Terrestrial Radio Access (E-UTRA); Multiplexing and channel coding (Release 9).' 3GPP TS 36.212 V9.2.0, Jun. 2010.

3GPP, '3rd Generation Partnership Project; Technical Specification Group Radio Access Network; Evolved Universal Terrestrial Radio Access (E-UTRA); Physical layer procedures (Release 8).' 3GPP TS 36.213 V8.8.0, Sep. 2009.

International Search Report and Written Opinion issued in corresponding International Patent Application No. PCT/KR2011/005315 dated Mar. 23, 2012.

* cited by examiner

CARRIER AGGREGATION MANAGEMENT AND RELATED DEVICE AND SYSTEM

This is a U.S. National Phase Entry of PCT Application No. PCT/KR2011/005315, filed Jul. 20, 2011, and claims the benefit of U.S. Provisional Application No. 61/414,354 filed Nov. 16, 2010.

TECHNICAL FIELD

The present invention relates to carrier aggregation management in a radiocommunication system.

BACKGROUND ART

Many different types of radiocommunication systems (i.e. networks) exist. GSM, UMTS, LTE and LTE-advanced are non-limiting examples of such radiocommunication systems.

FIG. 1 is a block diagram showing a radiocommunication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user data or control data can be used between BSs 20 (in the present document, the term "data" is used as a synonymous for "traffic" and does not imply any limitation as to the nature of such data, which can refer e.g. to user traffic or control traffic i.e. signaling). The BSs 20 are interconnected with each other by means of an X2 interface. The BSs 20 are also connected by means of the S1 interface to the EPC (Evolved Packet Core). They may interface to the aGW (E-UTRAN Access Gateway) via the S1. In the example shown in FIG. 1, the BSs 20 are more specifically connected to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

FIG. 2 gives an overview of the E-UTRAN architecture where:
  eNB, aGW Control Plane and aGW User Plane boxes depict the logical nodes;
  The boxes within the eNB box from RRC to Inter Cell RRM as well as the boxes SAE Bearer Control and MM Entity within the aGW Control Plane box depict the functional entities of the control plane; and
  The boxes within the eNB box from PHY to RLC depict the functional entities of the user plane.

Functions agreed to be hosted by the eNB are: Selection of aGW at attachment; Routing towards aGW at RRC activation; Scheduling and transmission of paging messages; Scheduling and transmission of BCCH information; Dynamic allocation of resources to UEs in both uplink and downlink; The configuration and provision of eNB measurements; Radio Bearer Control; Radio Admission Control; Connection Mobility Control in LTE_ACTIVE state.

Functions agreed to be hosted by the aGW are: Paging origination; LTE_IDLE state management; Ciphering of the user plane; PDCP; SAE Bearer Control; Ciphering and integrity protection of NAS signaling.

FIG. 3 shows the user-plane protocol stack for E-UTRAN.

RLC (Radio Link Control) and MAC (Medium Access Control) sublayers (terminated in eNB on the network side) perform the functions such as Scheduling, ARQ (automatic repeat request) and HARQ (hybrid automatic repeat request).

PDCP (Packet Data Convergence Protocol) sublayer (terminated in aGW on the network side) performs for the user plane functions such as Header Compression, Integrity Protection, Ciphering.

FIG. 4 shows the control-plane protocol stack for E-UTRAN. The following working assumptions apply.

RLC and MAC sublayers (terminated in eNB on the network side) perform the same functions as for the user plane;

RRC (Radio Resource Control) (terminated in eNB on the network side) performs the functions such as: Broadcast; Paging; RRC connection management; RB control; Mobility functions; UE measurement reporting and control.

PDCP sublayer (terminated in aGW on the network side) performs for the control plane the functions such as: Integrity Protection; Ciphering.

NAS (terminated in aGW on the network side) performs among other things: SAE bearer management; Authentication; Idle mode mobility handling; Paging origination in LTE_IDLE; Security control for the signaling between aGW and UE, and for the user plane.

RRC uses the following states:

1. RRC_IDLE:

UE specific DRX configured by NAS; Broadcast of system information; Paging; Cell re-selection mobility; The UE shall have been allocated an id which uniquely identifies the UE in a tracking area; No RRC context stored in the eNB.

2. RRC_CONNECTED:

UE has an E-UTRAN-RRC connection; UE has context in E-UTRAN; E-UTRAN knows the cell which the UE belongs to; Network can transmit and/or receive data to/from UE; Network controlled mobility (handover); Neighbour cell measurements; At RLC/MAC level: UE can transmit and/or receive data to/from network; UE also reports channel quality information and feedback information to eNB.

The network signals UE specific paging DRX (Discontinuous Reception) cycle. In RRC Idle mode, UE monitors a paging at a specific paging occasion of every UE specific paging DRX cycle. The paging occasion is a time interval where a paging is transmitted. UE has its own paging occasion. A paging message is transmitted over all cells belonging to the same tracking area. If UE moves from a tracking area to another tracking area, UE will send a tracking area update message to the network to update its location.

A physical channel transfers signaling and data between UE L1 and eNB L1. As shown in FIG. 5, the physical channel transfers them with a radio resource which consists of one or more sub-carriers in frequency and one more symbols in time. 6 or 7 symbols constitute one sub-frame which is 0.5 ms in length. The particular symbol(s) of the sub-frame, e.g. the first symbol of the sub-frame, can be used for the PDCCH (Physical Downlink Control Channel). PDCCH channel carries L1 signaling.

A transport channel transfers signaling and data between L1 and MAC layers. A physical channel is mapped to a transport channel.

Downlink transport channel types are:
1. Broadcast Channel (BCH) used for transmitting system information
2. Downlink Shared Channel (DL-SCH) characterised by: support for HARQ;
support for dynamic link adaptation by varying the modulation, coding and transmit power; possibility to be broadcast in the entire cell; possibility to use beamforming; support for both dynamic and semi-static resource allocation
3. Paging Channel (PCH) used for paging a UE
4. Multicast Channel (MCH) used for multicast or broadcast service transmission.

Uplink transport channel types are:
1. Uplink Shared Channel (UL-SCH) characterised by: possibility to use beamforming; (likely no impact on specifications); support for dynamic link adaptation by varying the transmit power and potentially modulation and coding; support for HARQ
2. Random Access Channel(s) (RACH) used normally for initial access to a cell.

The MAC sublayer provides data transfer services on logical channels. A set of logical channel types is defined for different kinds of data transfer services as offered by MAC. Each logical channel type is defined by what type of information is transferred.

A general classification of logical channels is into two groups:
Control Channels (for the transfer of control plane data);
Traffic Channels (for the transfer of user plane data).
Control channels are used for transfer of control plane data only. The control channels offered by MAC are:
Broadcast Control Channel (BCCH)
A downlink channel for broadcasting system control information
Paging Control Channel (PCCH)
A downlink channel that transfers paging information. This channel is used when the network does not know the location cell of the UE.
Common Control Channel (CCCH)
this channel is used by the UEs having no RRC connection with the network.
Multicast Control Channel (MCCH)
A point-to-multipoint downlink channel used for transmitting MBMS control data from the network to the UE.
Dedicated Control Channel (DCCH)
A point-to-point bi-directional channel that transmits dedicated control data between a UE and the network. Used by UEs having an RRC connection.

Traffic channels are used for the transfer of user plane data only. The traffic channels offered by MAC are:
Dedicated Traffic Channel (DTCH)
A Dedicated Traffic Channel (DTCH) is a point-to-point channel, dedicated to one UE, for the transfer of user data. A DTCH can exist in both uplink and downlink.
Multicast Traffic Channel (MTCH)
A point-to-multipoint downlink channel for transmitting traffic data from the network to the UE.

In Uplink, the following connections between logical channels and transport channels exist:
DCCH can be mapped to UL-SCH;
DTCH can be mapped to UL-SCH.
In Downlink, the following connections between logical channels and transport channels exist:
BCCH can be mapped to BCH;
PCCH can be mapped to PCH;
DCCH can be mapped to DL-SCH;
DTCH can be mapped to DL-SCH;
MCCH can be mapped to MCH;
MTCH can be mapped to MCH;

Conventionally, only one carrier (e.g. a frequency band) is used at a time with respect to a given UE for transporting data, such as useful data and/or control data.

But for supporting wider transmission bandwidths, it would be better to use carrier aggregation, that is simultaneous support of multiple carriers. Carrier aggregation would thus involve transporting data, such as useful data and/or control data, over a plurality of carriers with respect to a given UE. It would thus enhance the conventional carrier usage and be adapted to the multiple access type of the considered radio communication system.

As far as LTE is concerned, carrier aggregation has been introduced in a recent version thereof, so-called LTE-Advanced, which extends LTE Release 8 (LTE Rel-8). Some aspects of carrier aggregation are disclosed for example in 3GPP TR 36.814 V0.4.1, 3rd Generation Partnership Project; Technical Specification Group Radio Access Network; Further Advancements for E-UTRA Physical Layer Aspects (Release 9) released in February 2009 (see section 5 in particular), as well as in subsequent versions thereof. Other standard documents, which are well known by one skilled in the art, relate to other aspects of carrier aggregation.

Thus LTE-Advanced allows having two or more carriers, so-called component carriers (CCs), aggregated in order to support wider transmission bandwidths e.g. up to 100 MHz and for spectrum aggregation.

In contrast with an LTE Rel-8 terminal, an LTE-Advanced terminal with reception and/or transmission capabilities for carrier aggregation can simultaneously receive and/or transmit on multiple component carriers.

According to a non-limiting example, a carrier may be defined by a bandwidth and a center frequency. If five carriers are assigned as granularity of carrier unit having a 5 MHz bandwidth, carrier aggregation may lead to a bandwidth of a maximum of 25 MHz.

Contiguous spectrum aggregation and/or non-contiguous spectrum aggregation may take place. The contiguous spectrum aggregation uses contiguous carriers and the non-contiguous spectrum aggregation uses discontiguous carriers. The number of aggregated carriers may be different in uplink and downlink. When the number of downlink carriers and that of uplink carriers are equal, it is called a symmetric aggregation, and when the numbers are different, it is called an asymmetric aggregation.

The size (i.e., the bandwidth) of multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

FIG. 6 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate e.g. in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control data such as HARQ ACK/NAK in response to downlink transmission, scheduling request and channel quality indicator (CQI). A physical uplink shared channel (PUSCH) carries uplink shared channel (UL-SCH).

Each component carrier may have its own control channel, i.e. PDCCH. Alternatively, only some component carriers may have an associated PDCCH, while the other component carriers do not have their own PDCCH.

Component carriers may be divided into a primary component carrier (PCC) and one or several secondary component carriers (SCCs) depending on whether they are activated. A PCC refers to a component carrier that is constantly activated, and an SCC refers to a component carrier that is activated or deactivated according to particular conditions. Activation means that transmission or reception of traffic data is performed or traffic data is ready for its transmission or reception. Deactivation means that transmission or reception of traffic data is not permitted. In the deactivation, measurement is made or minimum information can be transmitted or received. The UE generally uses only a single PCC and possibly one or more SCCs along with the PCC.

A PCC is a component carrier used by a BS (i.e. an eNB in the context of LTE/LTE-A) to exchange traffic and PHY/MAC control signaling (e.g. MAC control messages) with a UE. SCCs carriers are additional component carriers which the UE may use for traffic, only per BS's specific commands and rules received e.g. on the PCC. The PCC may be a fully configured carrier, by which major control data is exchanged between the BS and the UE. In particular, the PCC is configured with PDCCH. The SCC may be a fully configured component carrier or a partially configured component carrier, which is allocated according to a request of the UE or according to an instruction of the BS. The PCC may be used for entering of the UE into a network or for an allocation of the SCC. The primary carrier may be selected from among fully configured component carriers, rather than being fixed to a particular component carrier. A component carrier set as an SCC carrier may be changed to a PCC.

A PCC may further have at least some of the following characteristics:
  to be in accordance with the definitions of the PCC introduced in Rel-10 CA;
  uplink PCC and downlink PCC may be configured per UE;
  uplink PCC may be used for transmission of L1 uplink control data;
  downlink PCC cannot be de-activated;
  re-establishment may be triggered when the downlink PCC experiences RLF (radio link failure), not when other downlink CC's experience RLF;
  SI (system information) reception for the downlink PCC, Rel-8 procedures may apply;
  this may not imply anything for the reception of the SI of other configured CC's;
  NAS information may be taken from the downlink PCC cell.

With respect to a given UE and a given eNB or base station, the uplink and downlink PCCs are designated by the common term PCell (i.e. primary serving cell), while the uplink and downlink SCCs are designated by the common term SCell (i.e. secondary serving cell), as well known in the art.

When considering Carrier Aggregation (CA), an SCell activation/deactivation mechanism may be carried out in order to increase the data rate (uplink or/and downlink). In this case, a PCell may carry an explicit activation/deactivation of a configured SCell signalled e.g. by a MAC control element (MAC CE). For more details about MAC CEs, the reader can refer for example to the technical specification 3GPP TS 36.321 V8.8.0 (2009-12), 3rd Generation Partnership Project; Technical Specification Group Radio Access Network; Evolved Universal Terrestrial Radio Access (E-UTRA) Medium Access Control (MAC) protocol specification (Release 8).

When an eNB sends an activation/deactivation MAC CE command to a UE for activating/deactivating an SCell, it must then wait for a certain amount of time before it can start or stop scheduling the UE on the newly activated/deactivated SCell. Likewise, the UE cannot immediately start or stop sending and reporting data or information (e.g. SRS, CSI, etc.) with respect to the newly activated/deactivated SCell.

This is partly because the UE needs some time to decode the activation/deactivation command and to take consequential changes in its receiving chain.

Even if it is assumed that the UE always receives activation/deactivation command on the first attempt (without a need for a retransmission), still the activating/de-activating carrier aggregation may have impacts on the UE reception e.g. due to the need for radio frequency (RF) retuning when the UE effective Rx and/or Tx bandwidth is modified. For example, in an intra-band contiguous case, it would be necessary to configure the receiver to have wider reception bandwidth (e.g. change reception bandwidth from 20 MHz to 40 MHz) or in reverse to have narrower bandwidth (e.g. changing reception bandwidth from 40 MHz to 20 MHz). This would require UE to adjust the local oscillator (LO) position and reconfigure the baseband filters.

When the UE is performing RF retuning, it cannot receive scheduling transmissions on any of the activated DL SCCs in the same frequency band, as well as on the corresponding UL CCs. Moreover, the UE is not able to receive the DL HARQ ACK/NACK for a corresponding UL transmission happening just before RF retuning start.

As a result, if the activation/deactivation command is sent by the eNB in order to be received in subframe n by the UE, the eNB and the UE may have to wait until the subframe n+X for the SCell to be ready for operation. This situation is illustrated in FIG. 7 for an exemplary SCell activation case.

DISCLOSURE OF INVENTION

Technical Problem

In practice, the number of X subframes is implemented as a hard timing constraint that must be applied: in other words, the eNB and/or UE assumes that the SCell is activated/deactivated at the subframe n+X. The new mode of operation on the SCell does not take place before the subframe n+X, even if it could theoretically take place one or few subframes before.

The delay of X subframes after the activation/deactivation command is received by the UE may be troublesome, since the SCell cannot be correctly used in the meantime.

Solution to Problem

To improve this situation, the invention proposes a method for managing activation or deactivation of a secondary serving cell, SCell, for a base station of a radiocommunication network and a User Equipment, UE, initially using a primary serving cell, PCell, and supporting Carrier Aggregation so as to aggregate SCell to PCell. This method comprises:

the UE obtaining information suggesting that an activation/deactivation command to activate/deactivate an SCell is likely to be received by the UE from the base station, said information obtaining taking place before said activation/deactivation command is actually received;

activating/deactivating an SCell as early as possible after said activation/deactivation command is received by the UE from the base station.

In this way, the UE anticipates the reception of the activation/deactivation command and can accelerate the activation/deactivation of the SCell. Compared to the above-mentioned prior art, this significantly reduces the delay before the SCell is activated/deactivated, since the UE does not wait for the activation/deactivation command being actually received.

With reference to the example mentioned above, this means that the SCell may be activated/deactivated earlier than in the subframe n+X. For example, it would thus be activated/deactivated in subframe n+Y, where Y is less than X, or possibly even before subframe n.

The anticipation of the reception by the UE of an activation/deactivation command can be based on any relevant information suggesting the likelihood of such event.

According to advantageous embodiments that may be combined in any possible manner:

the SCell activating/deactivating takes place before the end of a predetermined maximum activation time starting when said activation/deactivation command is received by the UE from the base station; and/or said information suggesting that an activation/deactivation command to activate/deactivate an SCell is likely to be received by the UE from the base station comprises information relating to a traffic load on the PCell; and/or said information suggesting that an activation/deactivation command to activate/deactivate an SCell is likely to be received by the UE from the base station comprises information relating to an interference level on the PCell; and/or said information suggesting that an activation/deactivation command to activate/deactivate an SCell is likely to be received by the UE from the base station comprises information relating to an amount of resource already granted to the UE compared to an amount of resource requested by the UE; and/or said information suggesting that an activation/deactivation command to activate/deactivate an SCell is likely to be received by the UE from the base station comprises information relating to a data rate available on the PCell compared to a data rate expected by the UE; and/or said information suggesting that an activation/deactivation command to activate/deactivate an SCell is likely to be received by the UE from the base station is obtained at least in part by signalling from the base station to the UE; and/or said information suggesting that an activation/deactivation command to activate/deactivate an SCell is likely to be received by the UE from the base station is obtained at least in part by determination made by the UE itself.

The invention also proposes a User Equipment, UE, initially using a primary serving cell, PCell, with a base station of a radiocommunication network and supporting Carrier Aggregation so as to aggregate SCell to PCell. The UE comprises a processor, a RF unit and a memory, and is arranged for:

obtaining information suggesting that an activation/deactivation command to activate/deactivate a secondary serving cell, SCell, with the base station is likely to be received by the UE from the base station, said information obtaining taking place before said activation/deactivation command is actually received;

causing an SCell to be activated/deactivated as early as possible after said activation/deactivation command is received by the UE from the base station.

The invention also proposes a system including a base station of a radiocommunication network and a User Equipment, UE, initially using a primary serving cell, PCell, and supporting Carrier Aggregation so as to aggregate SCell to PCell, the system being arranged for managing activation or deactivation of a secondary serving cell for the base station of a radiocommunication network and the UE according to the above-mentioned method.

In this system, the base station may comprises a processor, a RF unit and a memory and be arranged for signaling to the UE information from which the UE can derive information suggesting that an activation/deactivation command to activate/deactivate an SCell is likely to be received by the UE from the base station.

Advantageous Effects of Invention

The UE self detects that eNB will send MAC CE SCell activation/deactivation command. This can be possible e.g. because the eNB would not have decided to use the SCell for data transmission if it was not already fully loaded for other UEs' traffic. So any indications that allow the UE to predetermine eNB MAC CE activation/deactivation transmission can trigger SCell activation/deactivation from UE perspective. Such triggers may be based on: the traffic load, interference level, granted resources, data rate, etc. . . .

Therefore there is no need to delay the activation/deactivation of an SCell. UE implementation may activate/deactivate SCell as earlier as it can. The above-mentioned hard timing constraint (n+X) can thus be changed into a minimum requirement that SCell activation/deactivation shall apply no later than subframe n+X.

BEST MODE FOR CARRYING OUT THE INVENTION

The invention will be described hereafter in the context of an LTE-A system supporting carrier aggregation as mentioned above. It applies however to any other type of system including at least one base station and at least one UE or equivalent, as will be apparent to one skilled in the art.

Figure 9:
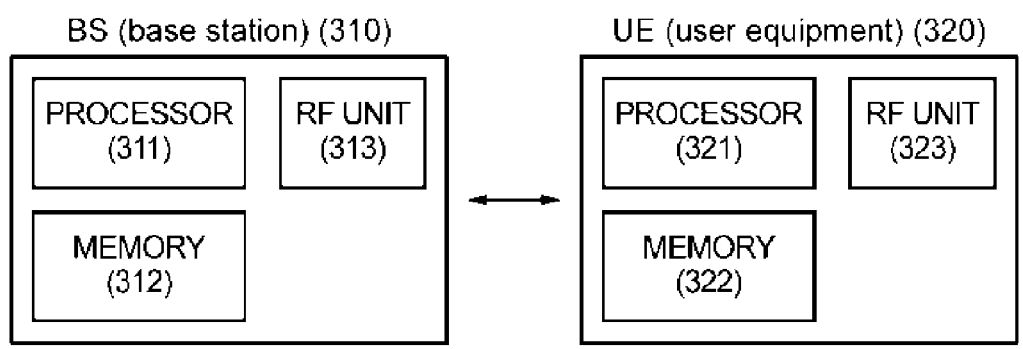
FIG. 9 is a diagram showing an exemplary and non-limiting wireless communication system according to an embodiment of the present invention.

FIG. 9 shows an exemplary and non-limiting wireless communication system including a BS 310 and one or more UE(s) 320. In downlink, a transmitter may be a part of the BS 310, and a receiver may be a part of the UE 320. In uplink, a transmitter may be a part of the UE 320, and a receiver may be a part of the BS 310. The BS 310 may include a processor 311, a memory 312, and a radio frequency (RF) unit 313. The processor 311 may be configured to implement proposed procedures and/or methods described in the present document. In the exemplary system of FIG. 9, the memory 312 is coupled with the processor 311 and stores a variety of information to operate the processor 311. The RF unit 313 is coupled with the processor 311 and transmits and/or receives a radio signal.

The UE 320 may include a processor 321, a memory 322, and a RF unit 323. The processor 321 may be configured to implement proposed procedures and/or methods described in the present document. The memory 322 is coupled with the processor 321 and stores a variety of information to operate the processor 321. The RF unit 323 is coupled with the processor 321 and transmits and/or receives a radio signal.

The BS 310 and/or the UE 320 may have single antenna or multiple antennas. When at least one of the BS 310 and the UE 320 has multiple antennas, the wireless communication system may be called a multiple input multiple output (MIMO) system.

The BS 310 and the UE 320 support carrier aggregation, meaning that they may use multiple component carriers (CCs). In particular, they are capable of aggregating SCell to PCell.

According to an aspect of the present invention, the BS 310 and the UE 320 initially use a primary serving cell, PCell.

Figure 8:
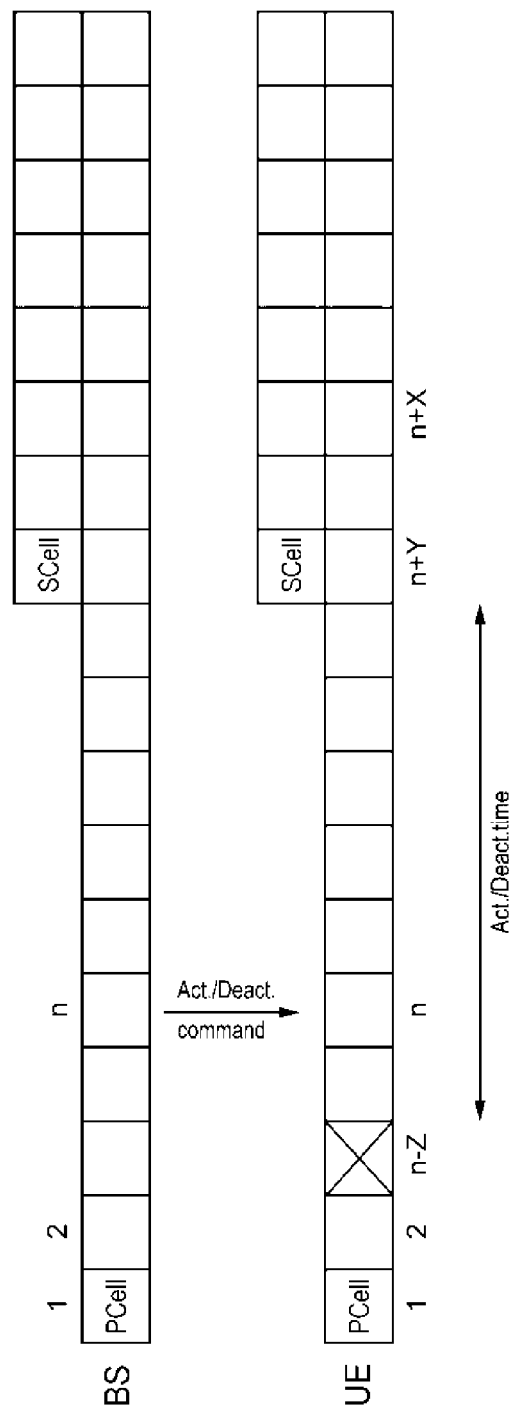
FIG. 8 is a diagram schematically showing an exemplary method for activating a secondary serving cell according to an embodiment of the present invention (similar figure can be derived therefrom for a secondary serving cell deactivation case)

At some point in time, for example in subframe n as shown in FIG. 8, an activation/deactivation command to activate/deactivate a secondary serving cell, SCell, may be transmitted from the BS 310 to the UE 320. This activation/deactivation command may be transmitted e.g. on the PCell, for example by means of a MAC control element (MAC CE) as mentioned above.

However, with the present invention, the UE 320 does not wait for the reception of the activation/deactivation command before starting activation/deactivation of the SCell.

On the contrary, the UE 320 obtains information suggesting that an activation/deactivation command to activate/deactivate an SCell is likely to be received by the UE 320 from the BS 310. This step takes place before the activation/deactivation command is actually received by the UE 320.

Such situation is illustrated in FIG. 8, where the information suggesting that an activation/deactivation command to activate/deactivate an SCell is likely to be received from the BS 310 is obtained by the UE 320 in subframe n-Z (marked with a cross), that is before the subframe n.

The information suggesting that an activation/deactivation command to activate/deactivate an SCell is likely to be received by the UE 320 from the BS 310 may be any type of information. Several examples are provided hereafter, that may be combined in any suitable manner. Any other example may also be used in addition or instead, as will be apparent to one skilled in the art.

According to a first example, said information comprises information relating to a traffic load on the PCell. Any known indicator for obtaining such traffic load on the PCell may be used in this regard.

When considering an SCell activation case, if the traffic load on the PCell is considered high, e.g. in comparison to a threshold, then it is likely that activation of an SCell will be needed in the short term in addition to the PCell to correctly serve the UE 320. In contrast, if the traffic load on the PCell is considered low, then the PCell may be sufficient so that there is no need for activation of an SCell.

When considering an SCell deactivation case, if the traffic load on the PCell is considered low, e.g. in comparison to a threshold, then it is likely that deactivation of an SCell will be needed in the short term, since the PCell is sufficient to correctly serve the UE 320. In contrast, if the traffic load on the PCell is considered high, then the PCell may not be sufficient so that no SCell deactivation should be performed.

According to a second example, said information comprises information information suggesting that an activation/deactivation command to activate/deactivate an SCell is likely to be received by the UE 320 from the BS 310 comprises information relating to an interference level on the PCell. Any known indicator for obtaining such interference level on the PCell may be used in this regard.

When considering an SCell activation case, if the interference level on the PCell is considered high, e.g. in comparison to a threshold, then it is likely that activation of an SCell will be needed in the short term in addition to the PCell to correctly serve the UE 320. In contrast, if the interference level on the PCell is considered low, then the PCell may be robust enough to correctly serve the UE 320 so that there is no need for activation of an SCell.

When considering an SCell deactivation case, if the interference level on the PCell is considered low, e.g. in comparison to a threshold, then it is likely that deactivation of an SCell will be needed in the short term, since the PCell is robust enough to correctly serve the UE 320. In contrast, if the interference level on the PCell is considered high, then the PCell may not be robust enough so that no SCell deactivation should be performed.

According to a third example, said information comprises information information suggesting that an activation/deactivation command to activate/deactivate an SCell is likely to be received by the UE 320 from the BS 310 comprises information relating to an amount of resource already granted to the UE 320 compared to an amount of resource requested by the UE. Any known indicator for obtaining such information may be used in this regard.

When considering an SCell activation case, if the amount of resource already granted to the UE 320, e.g. on the PCell, is considered low compared to an amount of resource requested by the UE (e.g. by comparing a ratio of the two amounts to a threshold), then it is likely that activation of an SCell will be needed in the short term in addition to the PCell to correctly serve the UE 320, i.e. to offer the UE 320 an amount of resource which is closer to its request. In contrast, if the amount of resource already granted to the UE 320, e.g. on the PCell, is considered in line with an amount of resource requested by the UE, then the PCell may be sufficient so that there is no need for activation of an SCell.

When considering an SCell deactivation case, if the amount of resource already granted to the UE 320, e.g. on the PCell, is considered high compared to an amount of resource requested by the UE (e.g. by comparing a ratio of the two amounts to a threshold), then it is likely that deactivation of an SCell will be needed in the short term, since the PCell is sufficient to correctly serve the UE 320. In contrast, if the amount of resource already granted to the UE 320, e.g. on the PCell, is considered low compared to an amount of resource requested by the UE, then the PCell may not be sufficient so that no SCell deactivation should be performed.

According to a first example, said information comprises information relating to a data rate available on the PCell compared to a data rate expected by the UE. Any known indicator for obtaining such information may be used in this regard.

When considering an SCell activation case, if the data rate available on the PCell is considered low compared to a data rate expected by the UE 320 (e.g. by comparing a ratio of the two data rates to a threshold), then it is likely that activation of an SCell will be needed in the short term in addition to the PCell to correctly serve the UE 320, i.e. to offer the UE 320 a date rate which is closer to its expectation. In contrast, if the data rate available on the PCell is considered in line with the data rate expected by the UE 320, then the PCell may be sufficient so that there is no need for activation of an SCell.

When considering an SCell deactivation case, if the data rate available on the PCell is considered high compared to a data rate expected by the UE 320 (e.g. by comparing a ratio of the two data rates to a threshold), then it is likely that deactivation of an SCell will be needed in the short term, since the PCell is sufficient to correctly serve the UE 320. In contrast, if the data rate available on the PCell is considered low compared to a data rate expected by the UE 320, then the PCell may not be sufficient so that no SCell deactivation should be performed.

The information suggesting that an activation/deactivation command to activate/deactivate an SCell is likely to be received by the UE 320 from the BS 310 may be obtained at least in part by signalling from the BS 310 to the UE 320. This may be the case for example when the BS 310 is the one that assesses or first obtains in any possible manner said information. Any type of signaling can be used for sending the information from the BS 310 to the UE 320. As an example, a message transmitted on a PDCCH may be used for that purpose.

In addition or in variant, the information suggesting that an activation/deactivation command to activate/deactivate an SCell is likely to be received by the UE 320 from the BS 310 may be obtained at least in part by determination made by the UE 320 itself. This may be the case for example when the UE 320 is the one that assesses or first obtains in any possible manner said information.

A combination of those two options is also possible. As a non limiting example, when considering the above-mentioned criterion of an amount of resource already granted to the UE 320 compared to an amount of resource requested by the UE 320, said amount of resource already granted to the UE 320 may be calculated and provided to the UE 320 by the BS 310 while the amount of resource requested by the UE 320 may be provided by the UE 320. A ratio of the two amounts of resource may then be calculated by the UE 320 itself. Many other examples may be envisaged, as will be apparent to one skilled in the art.

In any case, due to the mechanism mentioned above, the UE 320 can anticipate a possible future transmission by the BS 310 of an activation/deactivation command to activate/deactivate an SCell, as shown in FIG. 8.

After receiving the activation/deactivation command, the UE 320 then activates/deactivates an SCell as early as possible.

In particular, even if a predetermined maximum activation time starting when the activation/deactivation command is received by the UE 320 from the BS 310 is defined, the SCell activating/deactivating may advantageously take place before the end of that predetermined maximum activation.

Thus, with reference to FIG. 8, it can be seen that an SCell is activated (but may be deactivated) in the subframe n+Y, which is earlier than the subframe n+X mentioned above. It may also be that the SCell is activated or deactivated even before the subframe n itself.

Figure 1:
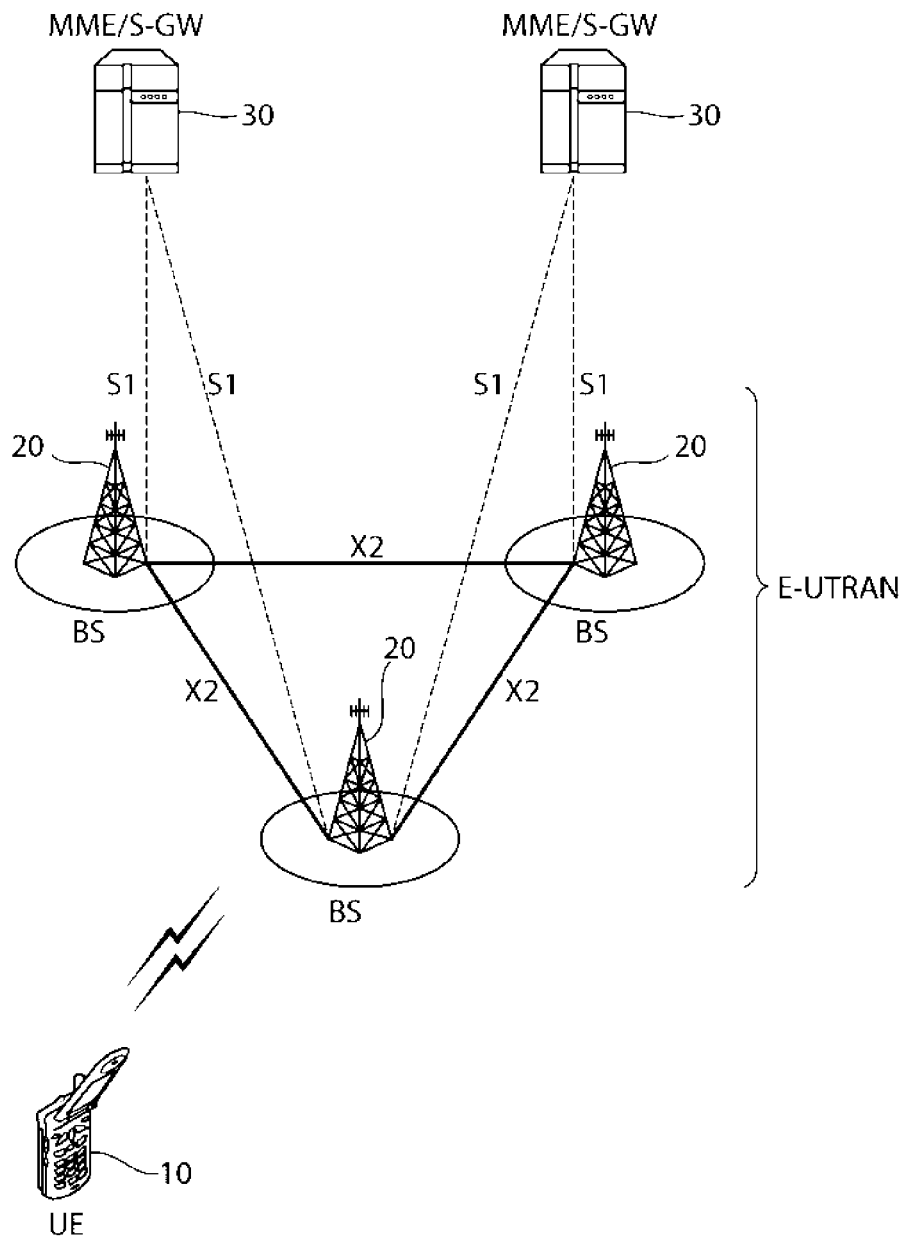
FIG. 1 is a diagram showing an exemplary radiocommunication system.
Figure 2:
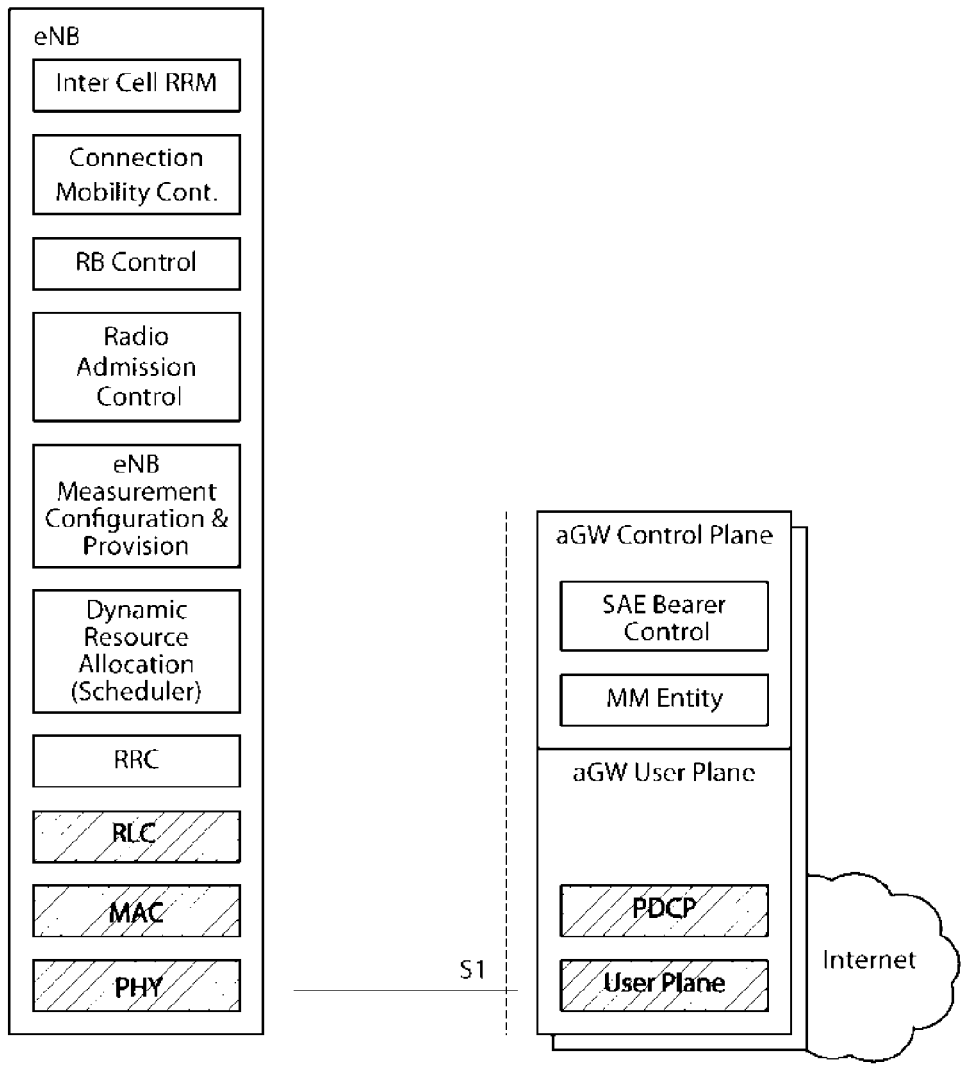
FIG. 2 is a diagram showing an exemplary overview of an E-UTRAN architecture.
Figure 3:
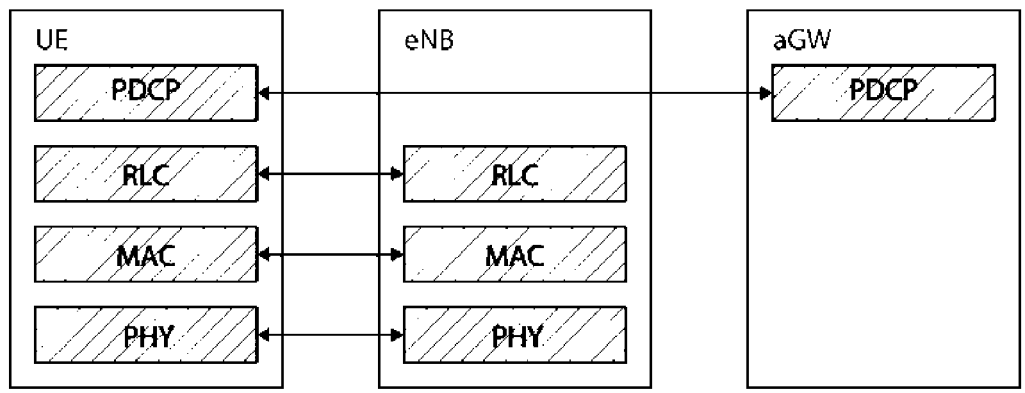
FIG. 3 is a diagram showing an exemplary user-plane protocol stack for E-UTRAN.
Figure 4:
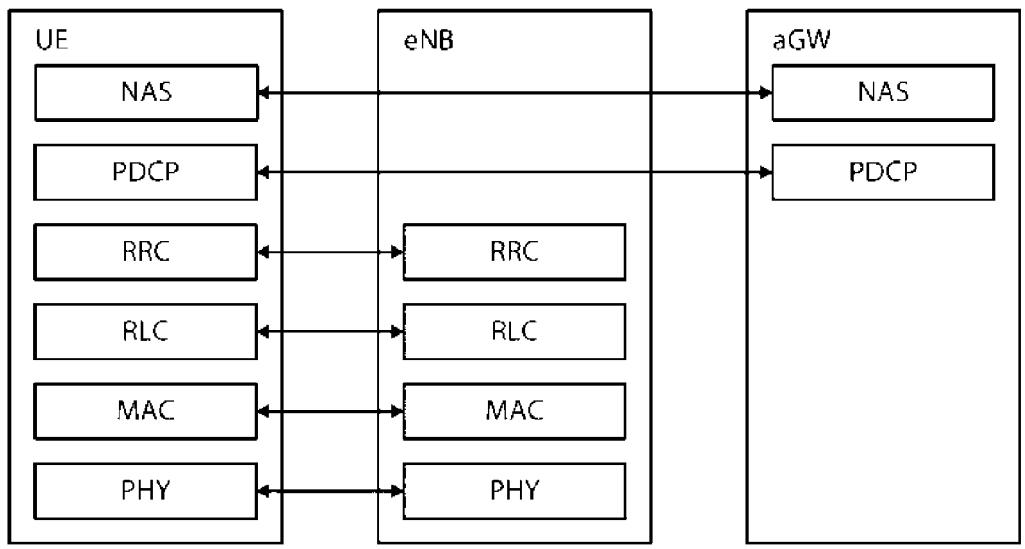
FIG. 4 is a diagram showing an exemplary control-plane protocol stack for E-UTRAN.
Figure 5:
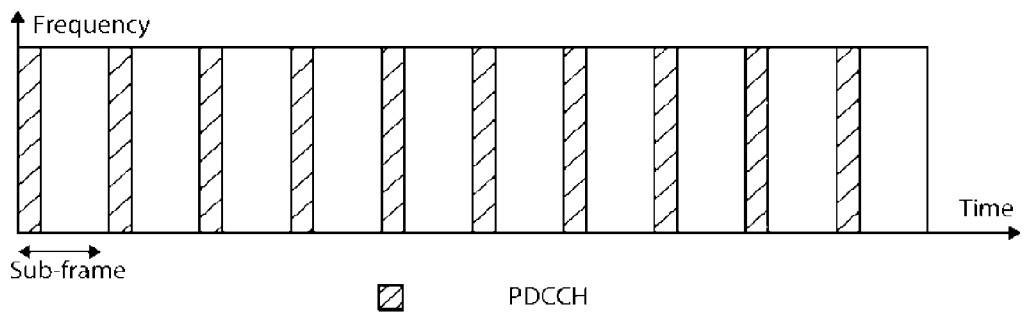
FIG. 5 is a diagram schematically showing a PDCCH channel arrangement.
Figure 6:
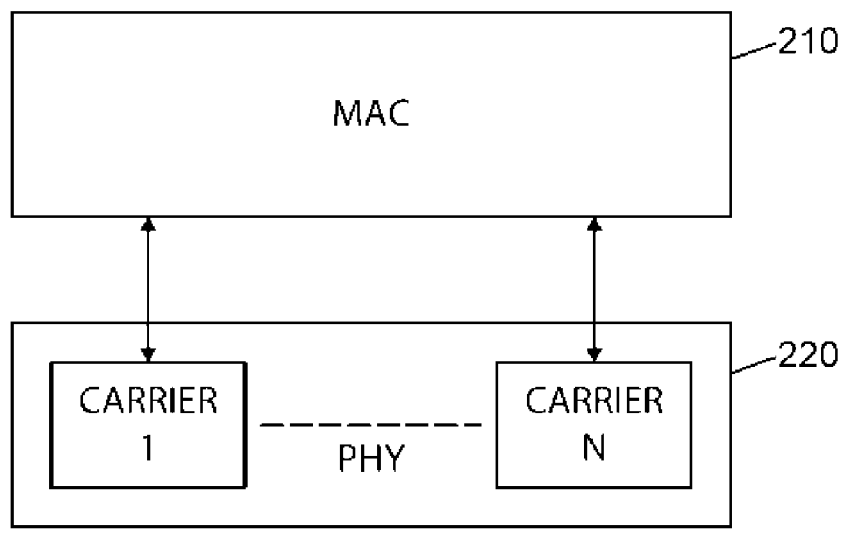
FIG. 6 is a diagram showing an exemplary protocol structure for supporting multiple carriers (carrier aggregation)
Figure 7:
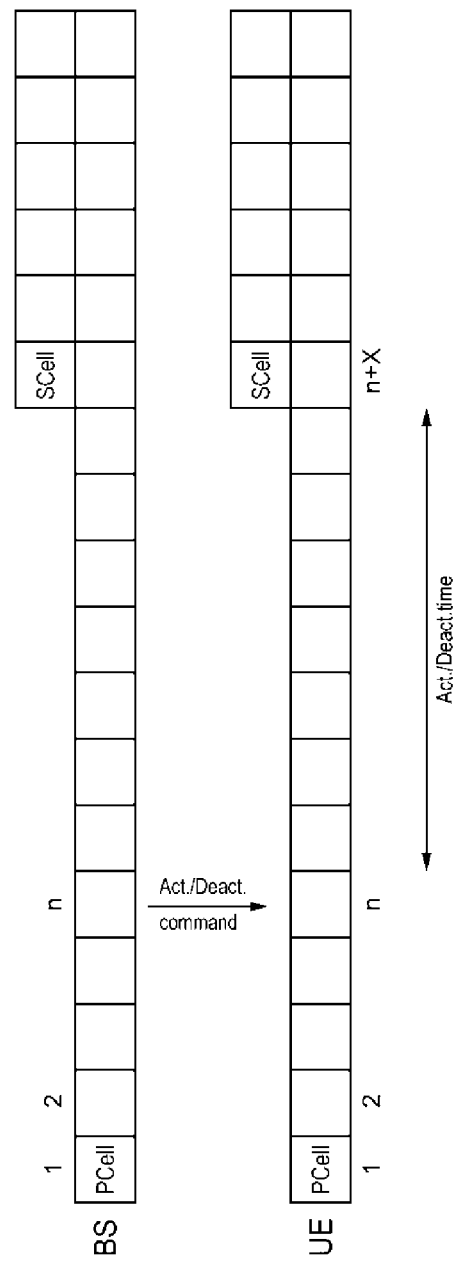
FIG. 7 is a diagram schematically showing a method for activating a secondary serving cell as known in the art.

In the example of FIG. 8, it still takes the UE 320 eight subframes to activate/deactivate the SCell, just like in the example of FIG. 7. In other words, X=Y−Z=8. But those eight subframes may not be a hard timing constraint in the present case. This means that if the UE 320 is capable of activating/deactivating the SCell is less than eight subframes, then it is free to do so. The same applies with respect to the BS 310.

The UE 320 may also inform the BS 310 when it has or is ready to activate/deactivate an SCell, so that the SCell can be activated/deactivated accordingly and simultaneously (or quasi simultaneously) on both sides.

Once an SCell is newly activated, then it can be used as well known in the art. For example, it may be used for uplink and/or downlink data transmission (where the term "data" has a broad meaning, which covers in particular both user traffic and control information). It can for example relate to transmission of data on a PDSCH and/or a PUSCH configured on the considered SCell. Alternatively or in addition, it can also relate to resource scheduling assignments on the considered SCell, uplink and/or downlink HARQ ACK/NACK for a corresponding downlink and/or uplink transmission on the considered SCell, and/or other.

Once an SCell is newly deactivated, then the above-mentioned data transmission cannot occur anymore on it.

INDUSTRIAL APPLICABILITY

Other embodiments may be envisaged within the framework of the present invention, as will be apparent to one skilled in the art.

The invention claimed is:

1. A method for managing activation or deactivation of a secondary serving cell SCell) for a base station of a radio communication network and a User Equipment (UE) initially using a primary serving cell (PCell) and supporting Carrier Aggregation to aggregate the SCell to the PCell, the method comprising:
   identifying whether a first information is obtained in a first subframe, the first information being information related to the PCell and has a first value, the first value being compared to a threshold value;
   receiving an activation command from the base station in a second subframe, the first frame being a previous frame of the second frame; and
   activating the SCell based on the activation command, the SCell being activated in a third subframe if the first information is not obtained in the first subframe, the SCell being activated in a fourth subframe if the first information is obtained in the first subframe and the first value is greater than or equal to the threshold, the fourth frame being a previous frame of the third frame.

2. The method as claimed in claim 1, wherein the first information is information relating to a traffic load on the PCell.

3. The method as claimed in claim 1, wherein the first information is information relating to an interference level on the PCell.

4. The method as claimed in claim 1, wherein the first information is information relating to an amount of resource already granted to the UE compared to an amount of resource requested by the UE.

5. The method as claimed in claim 1, wherein the first information is information relating to a data rate available on the PCell compared to a data rate expected by the UE.

6. The method as claimed in claim 1, wherein the first information is obtained at least in part by signalling from the base station to the UE.

7. The method as claimed in claim 1, wherein the first information is obtained at least in part by determination made by the UE itself.

8. A User Equipment (UE) initially using a primary serving cell (PCell) with a base station of a radio communication network and supporting Carrier Aggregation to aggregate a secondary serving cell (SCell) to the PCell, the UE comprising:
   a radio frequency (RF) unit
   a memory; and
   a processor configured to:
      identify whether a first information is obtained in a first subframe, the first information being information related to the PCell and having a first value, the first value being compared to a threshold value;
      receive an activation command from the base station in a second subframe, the first frame being a previous frame of the second frame; and
      activate the SCell based on the activation command, the SCell being activated in a third subframe if the first information is not obtained in the first subframe, the SCell being activated in a fourth subframe if the first information is obtained in the first subframe and the first value is greater than or equal to the threshold, the fourth frame being a previous frame of the third frame.

9. A system including a base station of a radio communication network and a User Equipment (UE) initially using a primary serving cell (PCell) and supporting Carrier Aggregation to aggregate a secondary serving cell (SCell) to the PCell, the system being arranged for managing activation or deactivation of a secondary serving cell for the base station of a radio communication network and the UE, wherein the UE comprises a processor configured to perform a method comprising:
   identifying whether a first information is obtained in a first subframe, the first information being information related to the PCell and has a first value, the first value being compared to a threshold value;
   receiving an activation command from the base station in a second subframe, the first frame being a previous frame of the second frame; and
   activating the SCell based on the activation command, the SCell being activated in a third subframe if the first information is not obtained in the first subframe, the SCell being activated in a fourth subframe if the first information is obtained in the first subframe and the first value is greater than or equal to the threshold, the fourth frame being a previous frame of the third frame.

10. The system as claimed in claim 9, wherein the base station comprises a processor, a RF unit and a memory and is arranged for signaling to the UE information from which the UE can derive the first information.

\* \* \* \* \*